F. B. TURNER.
DETECTOR.
APPLICATION FILED JUNE 4, 1914.
1,128,552.
Patented Feb. 16, 1915.
2 SHEETS—SHEET 2.
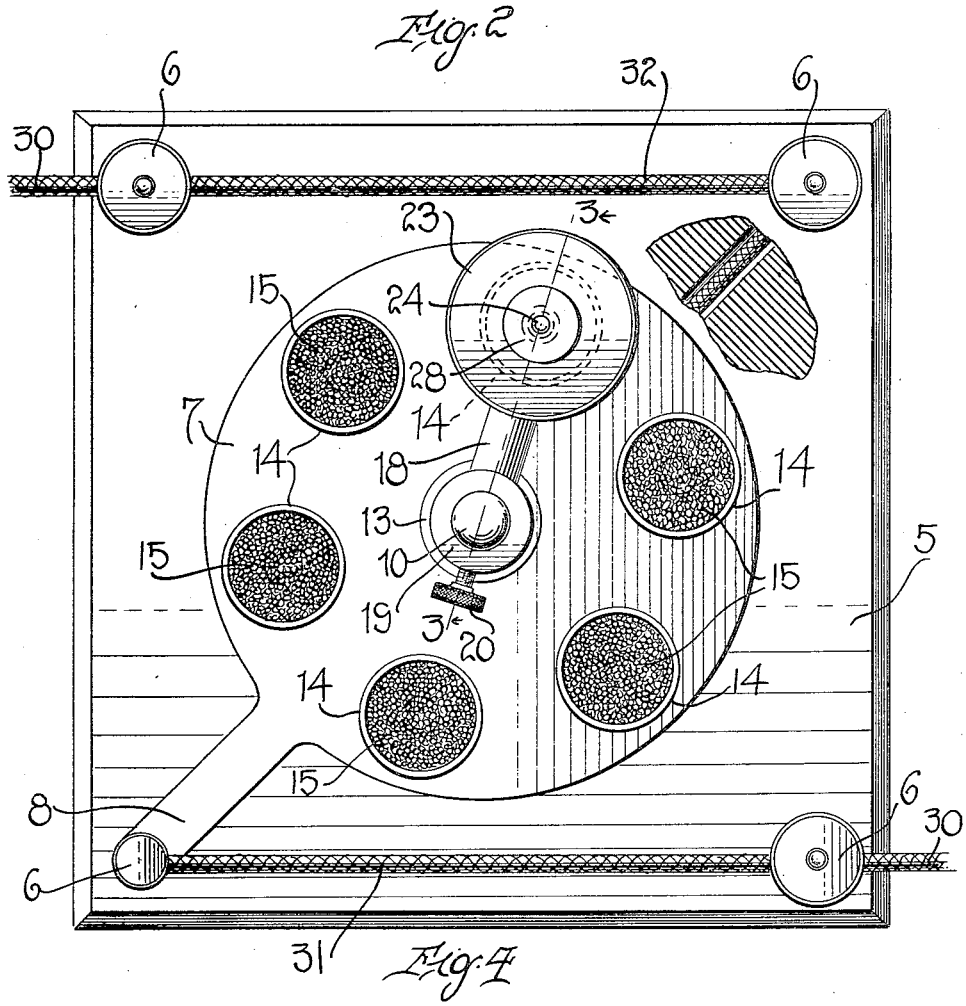
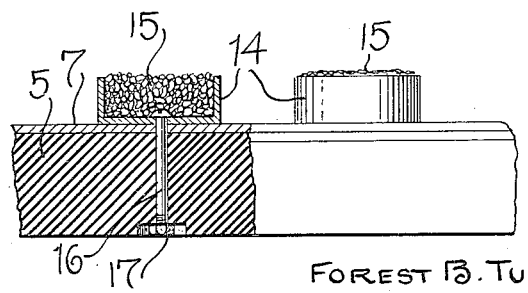
Inventor
FOREST B. TURNER.
Witnesses
Robert M. Sutphen
A. J. Hind.
By Watson E. Coleman
Attorney

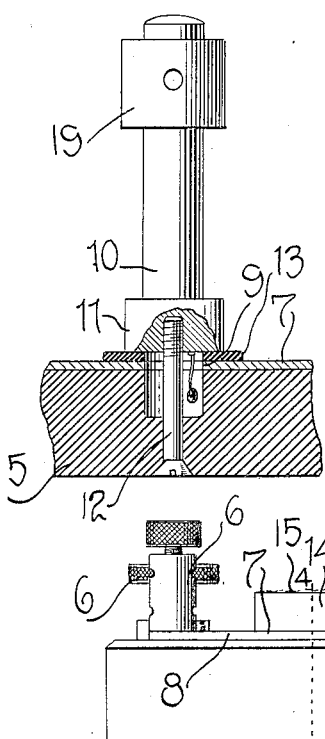
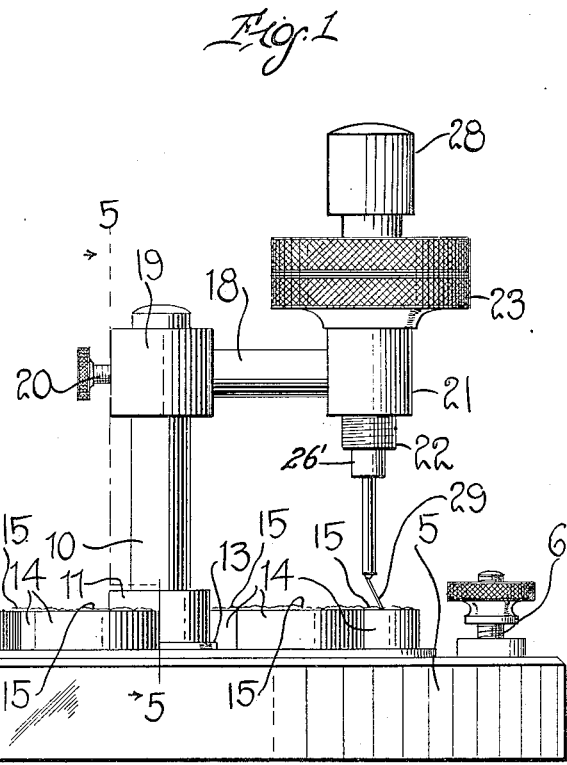
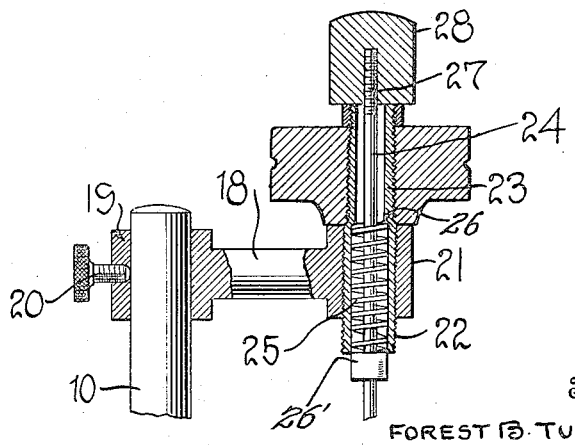

UNITED STATES PATENT OFFICE.

FOREST B. TURNER, OF HUNTINGTON BEACH, CALIFORNIA.

DETECTOR.

1,128,552.  Specification of Letters Patent.  Patented Feb. 16, 1915.

Application filed June 4, 1914. Serial No. 843,065.

*To all whom it may concern:*

Be it known that I, FOREST B. TURNER, a citizen of the United States, residing at Huntington Beach, in the county of Orange and State of California, have invented certain new and useful Improvements in Detectors, of which the following is a specification, reference being had to the accompanying drawings.

This invention relates to certain improvements in wireless telegraph receivers or oscillation detectors, and has for its primary object to provide certain improved structural features in such devices which will render the same highly sensitive to electromagnetic waves through the medium of which intelligence is communicated.

In its more specific aspect the invention consists in its preferred embodiment of a circularly arranged series of crystal masses which constitute the detecting elements, said crystals being mounted upon a common conductor plate connected to one side of the receiving circuit, and a contact member adjustably mounted upon the base whereby the same may be positioned and engaged with any one of the several crystal masses, said adjustable contact being connected to the other side of the receiving circuit.

The invention has for another important object to provide a particular mounting for the adjustable contact point or needle whereby liability of the same being broken when the instrument is subjected to severe shock or jar will be obviated.

It is a further object of my invention to produce a detector or oscillation receiver for use in wireless telegraphy and telephony which is simple and inexpensive in its construction, may be produced at comparatively small cost, and is highly efficient and reliable in practical use.

With the above and other objects in view, the invention consists in novel features of construction, combination, and arrangement of parts as will be hereinafter referred to and more particularly pointed out in the specification and claim.

For a full understanding of the invention, reference is to be had to the following description and accompanying drawings, in which—

Figure 1 is a side elevation of the improved detector illustrating the preferred embodiment thereof; Fig. 2 is a top plan view; Fig. 3 is a section taken on the line 3—3 of Fig. 2; and Fig. 4 is a section taken on the line 4—4 of Fig. 1. Fig. 5 is a section taken on the line 5—5 of Fig. 1.

Referring in detail to the drawing 5 designates a base constructed of suitable insulating material, and 6 indicates binding posts which are mounted in said base at the corners thereof.

Upon the upper surface of the base 5 a metal conductor plate 7, preferably circular in form is arranged, and this plate is provided with a narrow arm or extension 8 which is in electrical conductivity with one of the binding posts 6. The conductor plate 7 is centrally provided with an opening indicated at 9.

10 designates a cylindrical post or rod having an enlarged base 11 which is provided with a central threaded bore to receive the upper end of a fastening screw, or bolt 12 extending upwardly through the base 5. Between the enlarged lower end of the post 10 and the upper surface of the base 5 a disk of insulating fiber indicated at 13 is arranged around the edge of the opening 9 in the conductor plate 7. It will be noted that the securing screw or bolt 12 is spaced from the edges of this opening and out of contact with the metal conductor plate.

Upon the plate 7 a circularly arranged series of cylindrical cups 14 is disposed. Each of these cups contains a crystal mass 15 such as silicon or other analogous substance which is well known in the art as a detector element. Each of the cups 14 is rigidly secured upon the base 5 by a bolt 16 extending through the base of the cup, a securing nut 17 being threaded upon the lower end of said bolt. An arm 18 is provided with a sleeve 19 upon one end which is loosely engaged upon the rod or post 10. This arm extends horizontally from the post and is adapted to be fixed in an adjusted position thereon by means of the setscrew 20 which is threaded in said sleeve and adapted for binding engagement with the post. The other end of the arm 18 is also formed with a sleeve 21, said sleeve 21 having a threaded bore to receive the shank 22 of an adjusting screw 23. The screw 23 is longitudinally bored to loosely receive a rod 24. Upon said rod and within the bore of the adjusting screw a coil spring 25 is arranged, said spring bearing at its upper end against an internal shoulder 26 formed upon the rod 24 and at its lower end upon a collar 26' on the rod 24. The upper end of the rod 24 is threaded as indicated at 27 to receive a fiber nut or collar 28.

29 designates a contact point or needle which is suitably secured to the lower end of the rod 24 and is preferably bent as shown for bearing engagement upon the detector crystals 15.

The circuit terminals 30 of the receiving aerial are connected to the binding posts 6 located upon diagonally opposite corners of the base 5. 31 designates a wire which connects one of said latter posts 6 to the binding post with which the arm 8 of the conductor plate is engaged. A second conductor wire 32 extends from the other post 6 to which the circuit terminal is connected to the binding post upon the opposite side of the base and then to the vertically disposed post 10 whereon the adjustable contact point or needle 29 is mounted.

From the foregoing description taken in connection with the accompanying drawing, the construction of my improved detector will be readily understood. The detector is, of course, used in series with the usual telephone receiver such as now commonly employed with oscillation detectors in wire telegraphy and telephony. By the provision of a plurality of the crystalline masses, and the adjustable needle contact point 29, said needle may be readily disposed in engagement upon any one of the crystal masses which may have the greatest degree of inherent sensitiveness to the electro-magnetic waves, thus permitting the operator to obtain the very best possible results. The needle point 29 may be readily adjusted vertically in the outer end of the arm 18 by simply manipulating the screw 23 whereby its pressure upon the crystal may be regulated as desired. By the provision of the spring 25, it will be obvious that if the instrument is accidentally subjected to severe shock or jar, said spring will absorb such vibration and thereby prevent breakage of the needle contact point. The extent of movement of the rod 24 through the adjusting screw may be determined and varied by the proper adjustment of the fiber nut 28 upon the upper end of said rod. A detector of oscillation receiver embodying the features above described, is very serviceable and efficient in practical use and is of greater durability than instruments of a similar character now known in the art. At the same time, however, it will be appreciated that owing to the extremely simple construction of my invention the manufacturing cost thereof is not increased to any material extent. The several parts of the instrument may also be very easily and quickly assembled and disassembled when necessary for the purpose of cleaning or repair.

While I have above described the preferred form, construction, and arrangement of the several elements employed, it will be understood that the device is, nevertheless, susceptible of considerable modification therein, and I therefore reserve the privilege of resorting to all such legitimate changes as may be fairly embodied within the spirit and scope of the invention as claimed.

What is claimed is:

An electric wave detector comprising a conductor plate having a radially disposed arm formed upon its periphery to which one side of the receiving circuit is connected, a circularly arranged series of metal cups secured upon said plate and each containing a wave responsive medium, an insulating base upon the upper surface of which said plate is arranged, a centrally located terminal post, an insulating disk disposed between said post and the upper surface of said plate, a vertically disposed bolt extending through the base and threaded into the lower end of said post to secure the post and the conductor plate upon the base, said post being connected to the opposite side of the receiving circuit, an arm mounted upon said post, means for adjusting the arm vertically thereon and in a circular path, and a resiliently movable contact member carried by said arm for engagement upon the wave responsive medium in any one of said cups.

In testimony whereof I hereunto affix my signature in the presence of two witnesses.

FOREST B. TURNER.

Witnesses:
R. L. OBARR,
CHAS. R. NUTT.